APPARATUS FOR MOVEOUT RECORDING

Filed May 27, 1964 4 Sheets-Sheet 1

MELVIN J. WELLS,
THOMAS L. SLAVEN,
CARL H. SAVIT,
INVENTORS.

BY THEIR ATTORNEYS

Spensley & Horn.

Sept. 17, 1968 M. J. WELLS ET AL 3,402,387

APPARATUS FOR MOVEOUT RECORDING

Filed May 27, 1964 4 Sheets-Sheet 2

MELVIN J. WELLS,
THOMAS L. SLAVEN,
CARL H. SAVIT,
INVENTORS.

BY THEIR ATTORNEYS
Spensley & Horn.

APPARATUS FOR MOVEOUT RECORDING

Filed May 27, 1964 4 Sheets-Sheet 3

MELVIN J. WELLS,
THOMAS L. SLAVEN,
CARL H. SAVIT,
INVENTORS.

BY THEIR ATTORNEYS.

Spensley & Horn

MELVIN J. WELLS,
THOMAS L. SLAVEN,
CARL H. SAVIT,
INVENTORS.

BY THEIR ATTORNEYS.
Spensley & Horn.

United States Patent Office 3,402,387
Patented Sept. 17, 1968

3,402,387
APPARATUS FOR MOVEOUT RECORDING

Melvin J. Wells, Torrance, Thomas L. Slaven, Los Angeles, and Carl H. Savit, Van Nuys, Calif., assignors to Western Geophysical Company of America, Los Angeles, Calif., a corporation of Delaware Filed May 27, 1964, Ser. No. 370,633
5 Claims. (Cl. 340—15.5)

ABSTRACT OF THE DISCLOSURE

The present invention provides an improved multichannel signal reproducing apparatus having functional-generating cam and lever means for altering the time scale of signals reproduced by said apparatus according to a predetermined function of time having the form $$T_n = t + A_n + B_n[aF(t - t_0) + b]$$

Means are provided, in accordance with the present invention, for adjusting the values of each of the parameters of the function. The present invention includes means to produce a time displacement $(t - t_0)$; means to introduce a proportional factor, $a$, and means to produce a displacement constant, $b$. The apparatus of the present invention thus provides means for adjustment of these parameters and makes possible the use of a single cam defining some function, as for example, F(T), to produce new functions, $G_1(T)$, $G_2(T)$, etc., where $$G_n(T) = [a_n F(t_n - t_0) + b_n]$$

This invention relates to multi-channel recorders and, more particularly, to an improved multi-channel recorder having highly flexible means of applying time scale corrections and calibrations to the plurality of time scale signals transmitted to the recorder for recordation in respective channels thereof.

For many multi-channel magnetic recording purposes it is necessary or desirable to introduce arbitrary time origin corrections and calibrations into the input or output of the magnetic recorder. In many instances it is necessary to be able to apply such corrections and calibrations independently and variably to each channel of a multi-channel recording system. Such corrections and calibrations are especially desirable or necessary in connection with the magnetic recording of seismograph records utilized in geophysical exploration. Such a machine for introducing corrections and calibrations to a multi-channel time scale recording apparatus is described and claimed in U.S. Patent No. 3,044,041 issued July 10, 1962, to Salvatori, Wells, and Glenn entitled, "Multi-Channel Recording Apparatus," and assigned to the assignee of the present application. The present invention is related to the apparatus described therein and is an improvement of such apparatus as will become more apparent hereinafter. Accordingly, the apparatus of the present invention will be described in connection with a magnetic tape recorder used in geophysical exploration as an illustrative application and embodiment, and in connection with the use of illustrative apparatus by which signals are read from an uncorrected magnetic tape recording to form a corrected tape recording. It is to be understood, however, that the apparatus of the present invention is equally applicable to other seismograph recording systems and apparatus, such as that disclosed in Patent No. 3,045,241, issued July 17, 1962, to C. H. Savit for Oscillographic Camera and assigned to the assignee of the present application, which acts on seismographic data as they are received. Also the present invention is equally applicable to data reproducibly recorded on other media such as film, as well as ferro-electric, radio-magnetic, phonographic, and other recording methods known to the art.

In making seismographic surveys by the so called reflection method a record is made of the earth's disturbance produced at a given point by a detonation initiated near the earth's surface at another point. In general the record shows waves which have traversed paths close to the earth's surface and waves which have penetrated to layers of different properties or characteristics. In many cases, several interfaces are present at varying depths and the record will show waves reflected from such interfaces.

For purposes of illustration, in a common arrangement of seismographic exploratory and recording apparatus used for seismographic profiling work, a plurality of seismometer or detector groups are disposed in contact with the ground in a preferably straight line at opposite sides of the shot-point. A recording unit provided with suitable amplifying and recording means is electrically connected to the detectors to amplify and record the electrical impulses produced by the detectors upon the arrival at each detector group of seismograph waves generated by an explosion at the shot-point and reflected by the various underground formations.

The electrical impulses produced by the detector groups are recorded by multi-channel magnetic drum or tape recorders with a channel corresponding to each detector group. The desirability of being able to apply time origin corrections and time scale calibrations into a seismographic magnetic tape recorder is readily apparent, for example, in introducing moveout corrections or corrections due to the surface profile of the area being explored. Moveout corrections are necessary since the detector groups are at varying horizontal distances from the shot-point and a greater time interval will be required for a reflected wave to reach the outermost detector group than the time interval which is required for the reflected wave to reach an inner detector group from an interface the same vertical distance below each. As the depth of the reflection increases the time differential required to reach the various detector groups becomes smaller with the time differential between groups approaching zero as the depth of reflection approaches infinity. In addition to the above moveout consideration, the various detector groups will, in general, be situated at various elevations so that it will be desirable to make time scale adjustments to reduce all readings to a common horizontal plane. Similarly, origin adjustments are often necessary to compensate for varying amounts of near-surface weathered material under the different detector groups. In offshore explorations such corrections may be required by varying depths of water.

In the course of seismographic exploration, a multichannel magnetic tape is obtained as described above. In accordance with this invention a corrected time-scale record can then be obtained from the uncorrected record obtained in the field. Such a corrected record facilitates analysis of the results of the seismographic exploration. The multi-channel recorder of the present invention, having time-origin corrections and time-scale calibrations, is accordingly utilized to play back an uncorrected multichannel magnetic recording to produce a corrected output. That is, the uncorrected magnetic recording can be mounted upon the drum of the present invention with reading heads and played back in corrected form to furnish a corrected output from the apparatus which is used to record a corrected tape or to form a corrected visual record section.

With the advent of more sophisticated and extensive seismographic exploration and with the increasing importance of offshore exploration, the need for precisely corrected records has grown. Normal moveout present on multi-channel seismographic recordings has been found to vary from one shot location to another in a significant fashion, particularly when long arrays of seismometers are used and when corrected seismographic recordings must be combined, as for example by the means disclosed in our previously filed U.S. Patent No. 3,289,-153, for Method and Apparatus for Seismographic Composite Recording. Such composite recordings in which a plurality of records are added to increase the signal-to-noise ratio of the records received at the various detectors require accurate time-scale corrections and calibrations in order that the compositing can be successfully accomplished. In offshore explorations additional time-scale factors are introduced by the fact that the shot-point may vary due to wind and currents and the spread length may vary considerably in extent.

While a normal moveout removing machine such as the one described in U.S. Patent 3,044,041 supra is quite adequate to remove normal moveout for the purpose of preparing record sections of seismic data from relatively short arrays or spreads of seismometers, the use of such a device for longer spreads and for highly precise corrections frequently requires a completely impractical number of cams to be made with a comcomitant burden of very frequent cam changes. For example, in patent No. 3,044,-041, an apparatus is described which applies a time scale correction and calibration to each channel of a multi-channel recording apparatus by varying the time scale position of each magnetic head in the respective channel of the multi-channel recording apparatus. The time origin and time-scale calibration consists of applying to the time scale $t$ a transformation of the form $T_n=t+A_n+B_nF(t)$ where $T_n$ is the transformed time scale of the $n$th channel and $B_nF(t)$ is the time scale function of the $n$th channel. The static correction means in such apparatus provides variation of the origin point of the head by a pre-determined amount $A_n$. The dynamic calibration means provide movement of the head in accordance with a predetermined function $F_n(t)=B_nF(t)$ during rotation of the drum.

The portion of the time-scale transformation given above which is the function $F(t)$ of the time argument $t$ is determined by a cam which is inserted into the apparatus prior to operation thereof, the configuration of the cam being determined by the velocity characteristics of the geologic section and the spread length of the array used in the field. The came thus introduces the time function which is common to all channels of the apparatus. The component $B_n$ is varied for each channel by use of a dynamic-calibration lever arm employed to vary the amount of movement of the heads in each channel. That is, as discussed hereinbefore, the required moveout correction is maximum at $t=0$ and approaches 0 as $t$ approaches infinity. The dynamic time-scale corrections are then made such that the maximum time-scale correction at $t=0$ is applied to those channels in the record which correspond to the two detectors in the field array which are furthermost from the shot-point. In the apparatus of the type described, a plurality of magnetic reproducing heads are positioned proximate the circumference of a rotating cylindrical record, the record having a plurality of spaced apart parallel channels. Each of the reproducing heads is mounted for relative movement along the direction of time-scale recordation in the respective one of the channels.

The proportional movement of the heads in the respective channels is obtained by the dynamic lever arm. Each of the heads is connected at a predetermined distance from the pivot point of the arms; one arm being utilized for the channels corresponding to the detectors at the other side of the shot-point. The heads are then connected at a predetermined distance from the pivot point such that pivotal movement of the lever arm imparts a proportional movement to the reproducing heads. With the reproducing heads trimmed to a common time-scale origin and with no static correction introduced to the heads in the respective channels the plurality of heads are all aligned along a curve on the surface of the drum which corresponds to a maximum moveout configuration. The drum is then set in rotation at a steady rate and the time-function cam moves synchronously with the drum. The time-function cam has been previously selected and inserted into the apparatus for the proper moveout. The cam is so synchronized that at time $t=0$ corresponding to the previously recorded time of the shot initiation of the lobe of the cam is passed to the position at which the cam follower is moved the maximum distance to cause the maximum moveout correction. That is at time $t=0$ the heads will have been moved out of alignment by the maximum amount and assume a shallow V-shape or U-shape dependent upon the distribution along the lever arms with channels 1 and 24, in a 24-channel example, moved farthest from the origin line. With the drum rotating all channels other than the innermost channels will be advanced along the time scale with the maximum advance being accomplished by channels 1 and 24. Since the outermost, i.e., 1 and 24, channels correspond to the outermost detector groups in the seismometer spread the time delay due to the horizontal distance will be greatest at these detectors and channels. As $t$ increases and the drum and cam continue to rotate the moveout correction required becomes less as discussed hereinbefore. Accordingly the radius of the cam surface decreases in accordance with the function $F(t)$ until the end of significant recorded information. At this time the cam is moved to the position at which the cam follower is on the substantially constant minimum radius and all heads have been moved into alignment. From the foregoing it can be seen that for each operation of the apparatus a proper time-function cam must be selected and inserted into the apparatus. The shape of the cam will be dependent on the spread length of the field setup and upon the character of the area in which the surface profiling is conducted.

The present invention greatly reduces the necessity for the substitution of cams in such a movement apparatus and makes the apparatus more universal in application since the portion of the time scale transformation $F(t)$ can in most cases be varied from one recording or reproducing operation to the other without substitution or change of the cams.

Accordingly it is an object of the present invention to provide an improved apaparatus for adjusting data obtained by the reflection method of seismographic surveying by which the time-phase relationship of seismic disturbance at detectors distributed at various distances from the shot-point is accurately corrected for normal moveout.

It is another object of the present invention to provide a method of distributing a moveout correction among a plurality of seismograph traces in which the trace time is corrected to a high order of accuracy.

It is another object of the present invention to provide means for introducing time-scale calibrations and corections into magnetically recorded data.

It is a further object of the present invention to provide means for applying linear or non-linear time-scale calibrations independently and variably at each channel of a multi-channel magnetic recording system.

It is a further object of the present invention to provide apparatus for applying time-scale corrections and calibrations to each channel of a multi-channel magnetic recording system quickly and efficiently without the substitution of any working or operating parts of the apparatus.

It is another object of the present invention to provide an apparatus for reproducing seismograph informatin in a multi-channel recording apparatus which apparatus can introduce a broad range of compensations for varying spread lengths of field setups.

Yet another object of the present invention is to provide a multi-channel recording apparatus in which time-scale corrections and calibrations are to be introduced to each channel of the apparatus by a cam which introduces a time function of the recordation which apparatus includes means to effectively modify the shape of the time-function cam by use of simple easily made adjustments or settings.

Yet another object of the present invention is to provide a means for introducing time-scale corrections and calibrations to such apparatus for seismograph recording and to allow for changes in the length of the spread or array, which means for adjusting is adapted to be compatible with the effective changes of cam function and to permit an unlimited range of spreads and of units of measurements of such spreads.

The novel features which are believed to be characteristic of the invention both as to its organization and method of operation together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

Figure 1:
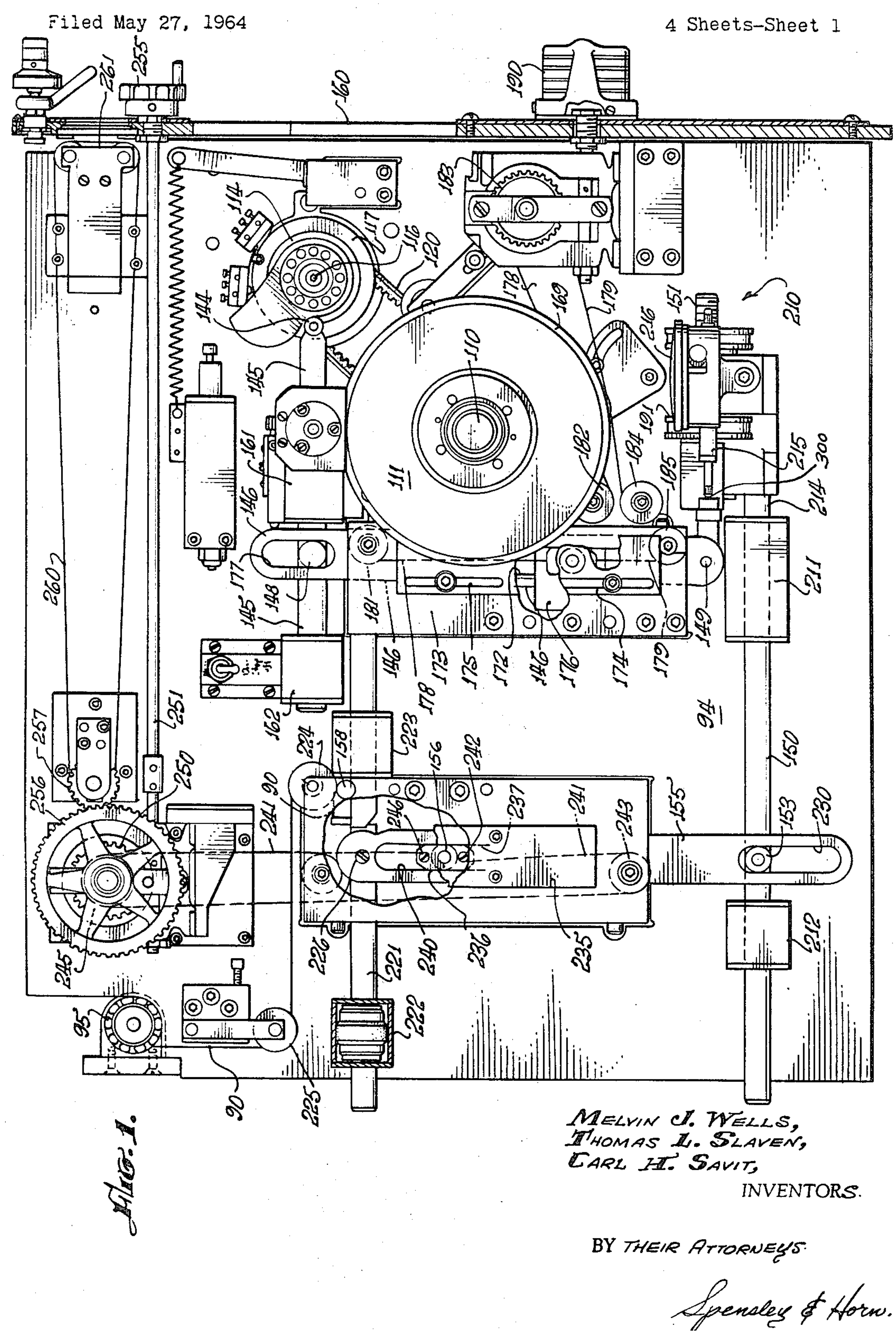
FIGURE 1 is a view in elevation of a presently preferred embodiment of the present apparatus with a side of the housing removed to show the operating components of the apparatus.

A moveout function can be described for a given spread length as a function F of time ($t$). Dependence of the function F($t$) on the spread length is particularly described in U.S. Patent No. 3,005,184 issued October 17, 1961, to Carl H. Savit entitled "Method and Apparatus For Seismographis Surveying." In virtually all geologic sections, the normal moveout function F($t$) has a restricted shape which may generally be described as a positive, monotonic-decreasing continuous function with a continuous first derivative and is crudely likened to one branch of an equilateral hyperbola one of whose asymptotes is the $t$ axis. As a practical matter F($t$) is absolutely limited in its upper value by the horizontal direct travel time for seismic waves. It is further limited by instrumental considerations related to the effective frequency shift or Doppler effect when $dF(t)/dt$ is $>\frac{1}{2}$. The time $t$ is limited by energy considerations and by the length of the recording medium. Thus in actuality it is only necessary to deal with a short segment of a quasi-hyperbolic curve as being typical of F($t$). By means of the present invention, any given function F($t$) represented by a specific cam can be readily modified to represent the function $G(t)=aF(t-t_0)+b$ where the parameters $a$, $b$ and $t_0$ are within the control of the operator. The class of linear transformations thus available to modify the moveout function represented by a time-function cam is adequate to permit approximation of very many actually observed moveout functions.

Finally by means of the apparatus of the present invention the operator has at his control the ability to further modify normal moveout for spread length so that, the new normal moveout function G($t$) having been chosen, the operator may apportion different portions to the two halves of the spread. That is, traces 1 to 12 representing the signals received from detectors 1 to 12 of a 24 detector field setup may receive a moveout function $p_1G(t)$ while traces 13 to 24 representing the signals received at detectors 13 to 24 at the opposite side of the shot point are corrected according to the function $p_2G(t)$.

The present invention is an improved apparatus for applying a time-scale correction and calibration to each channel of a multi-channel recording apparatus of the type wherein a plurality of recording or reproducing heads each of which defines a channel of the apparatus are positioned proximate the surface of a rotating drum having a recording medium affixed to the surface thereof. By means of the present invention the time-scale position of each magnetic head can be varied to achieve time-origin corrections and time-scale calibrations which consist of applying to the time scale T a transformation of the form $T_n=t+A_n+B_nF(t)$ where $T_n$ is the transformed time scale of the $n$th channel and $B_nF(t)$ is the time-scale calibration function of the $n$th channel. The quantity $A_n$ representing the static correction applied to the apparatus is applied in accordance with the prior art as described in Patent No. 3,044,041, supra, as is the quantity $B_n$ in the above transformation representing the dynamic calibration constant. It is with the portion F($t$) of the above transformation that the present invention is particularly concerned. In accordance with the present invention the present apparatus applies to the time scale $t$ a transformation of the form $T_n=t+A_n+B_n[aF(t-t_0)+b]$, as more fully discussed hereinafter in connection with a detailed description of the apparatus. Although the complete apparatus of the present invention is described in some detail hereinafter in order to describe the utility and operation of the overall apparatus it is to be understood that those portions of the apparatus common to those heretofore known to the art and particularly as set out in Patent No. 3,044,041, such as the means for mounting the reproducing heads, the means for introducing the static correction $A_n$ and the use of a dynamic calibration lever arm to introduce the constant $B_n$ to the transformation are not claimed as novel per se, but only as part of the combination making up the apparatus of the present invention.

Figure 2:
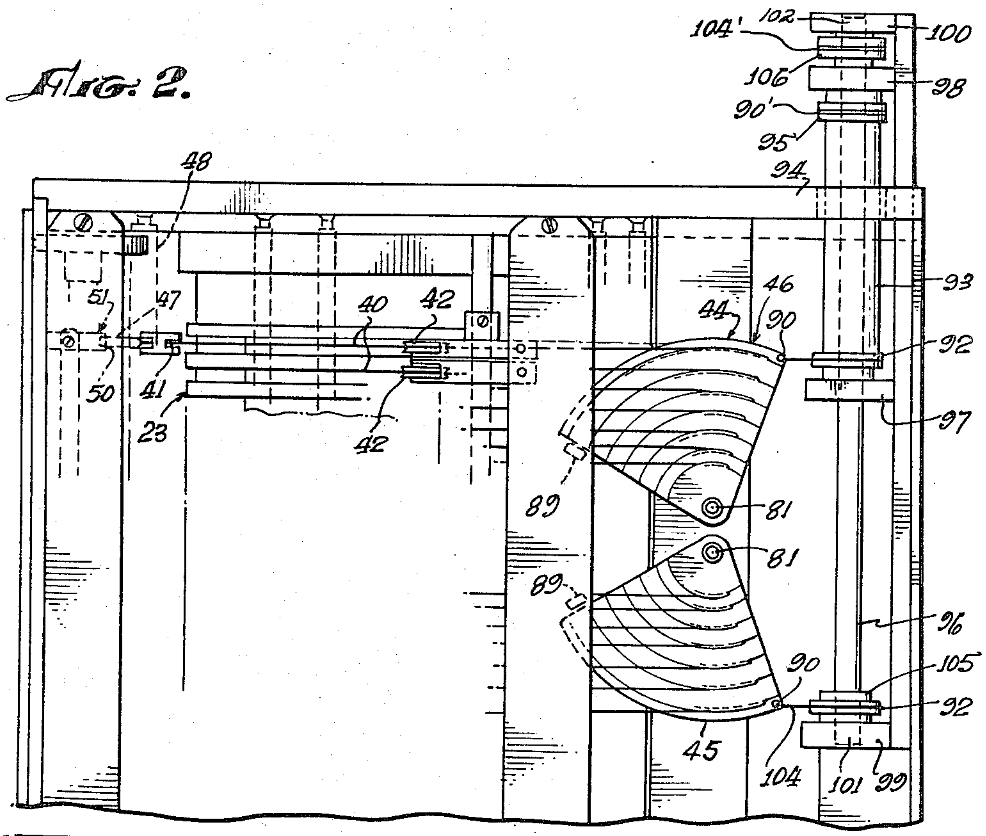
FIGURE 2 is a plan view of the apparatus with the top cover removed.
Figure 3:
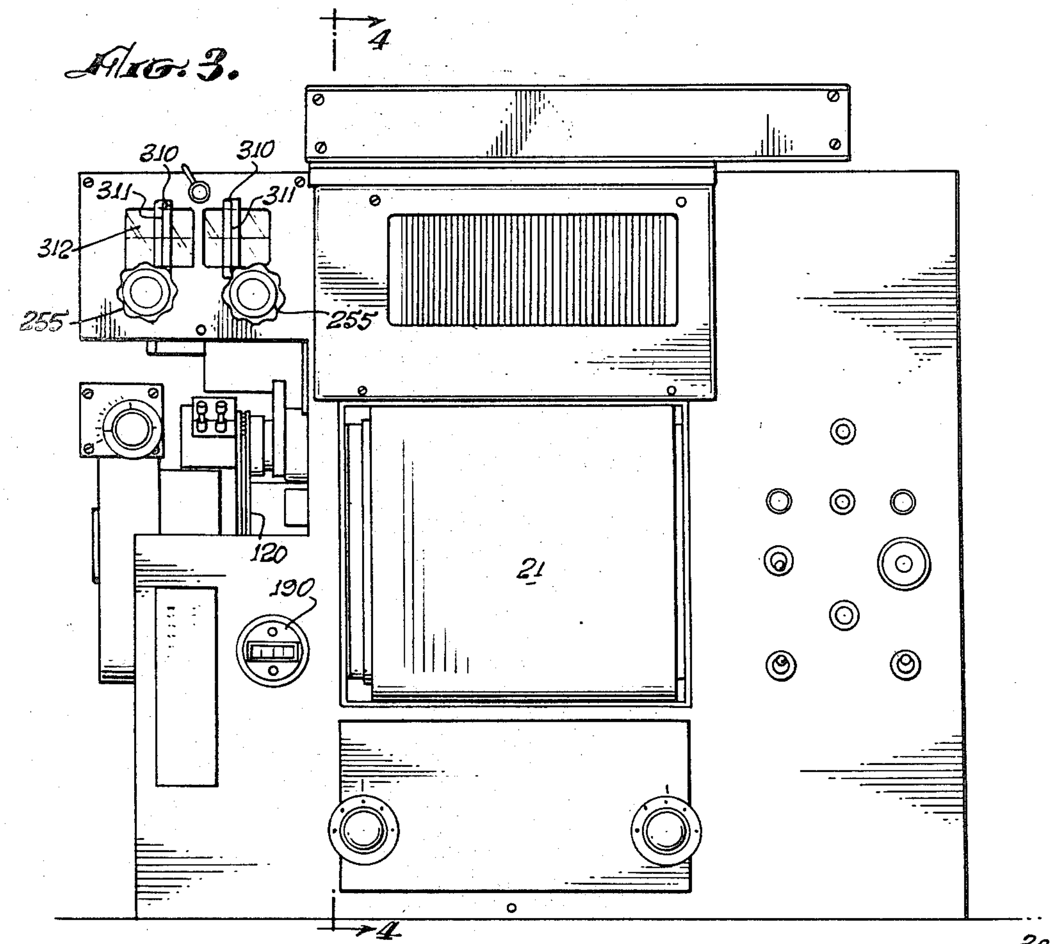
FIGURE 3 is a front view in elevation of the apparatus of the present invention.

Referring now to the drawing, FIGURES 1, 2 and 3 indicate a presently preferred embodiment of the apparatus in accordance with the present invention used in conjunction with two series of 12 channels each of an illustrative multi-channel magnetic recorder of the type wherein a magnetic tape is carried by a rotating drum. In the plan view of FIGURE 2 the apparatus of the present invention is completely shown in only one channel for purposes of clarity of description.

It is to be expressly understood that although seismographic exploration is used as an application which the present invention is particularly desirable the invention is not limited thereto and may be used in any application of the recording and/or playback apparatus of the type wherein a recording medium is moved in relation to a magnetic recording or reading head of the type well known to the art in which it is desirable to introduce arbitrary time-origin corrections or time-scale calibrations.

An electrical signal is transmitted by a detector group or other signal source through an amplifier (not shown) to the magnetic recording head 20 in this embodiment where it is impressed upon the surface of a magnetic tape which is affixed to the rotating drum 21 of the type well known to the art. Thus, the intensity of the electrical impulse received at the magnetic recording head 20 is related to the intensity of a reflected shock wave received at an individual detector group in the illustrative seismographic recording apparatus. The changes in the seismographic wave reaching the signal detector group will cause a variation in the signal intensity at the magnetic head 20 which has the characteristics of the reflected seismographic wave or other variable amplitudes signal emanating from the signal source.

The record produced upon the recording medium affixed to the rotating drum 21 is thus the time-scale record of the signal intensity with the time-scale $t$ introduced by the movement of the recording medium at a constant speed past the recording head 20.

The presently preferred embodiment of the present invention is described in connection with the application of the apparatus to an uncorrected multi-channel tape recording to produce a corrected recording of any type. Thus, in this embodiment of the magnetic heads are reading heads and a time-scale corrected recording is produced by a recording apparatus (not shown).

Figure 4:
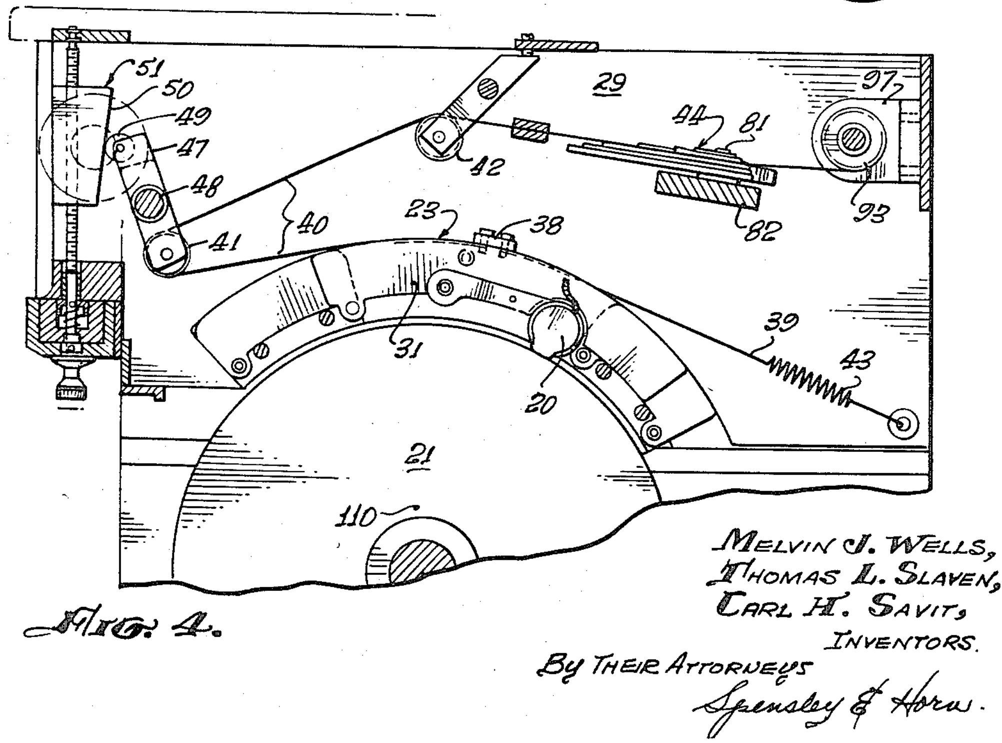
FIGURE 4 is a view in elevation taken along line 4—4 of FIGURE 3.

Referring now particularly to FIGURES 2 and 4, the plurality of magnetic heads 20 equal in number to the number of channels in the magnetic recorder are arranged in side by side relationship. Each head 20 is mounted for movable contact with respect to the rotating drum 21 by means of a head mounting race which is stationarily mounted with respect to the drums. Each magnetic head rests in sliding contact with the recording medium mounted upon the rotating drum 21. The races 23 are arranged in side by side relationship coincident with the plurality of channels to be recorded. Each race is thus parallel to a plane perpendicular to the axis of the rotating drum. A rocker mounting to which the magnetic head is pivotally affixed is movable within the respective head race arcuately along the surface of the drum to vary the position at which the head reads a signal upon the rotating recording medium affixed to the drum. Thus, each reproducing head is mounted with respect to the rotating drum to be movable independently in its respective channel along the direction which is the time scale direction of the channel.

In order to control the arcuate position of each recording head, a bracket 38 is affixed to the rocker mountings 31 with flexible cables 39 and 40 or similar connecting means, extending oppositely therefrom substantially in the plane of arcuate movement of the rocker member 31. The first cable 39 is affixed to a tensioning means such as a coil spring 43 which is in turn affixed to the apparatus chassis to urge the rocker member 31 to the right of the head race in FIGURE 4. The second cable 40 extends oppositely to the first cable 39 over a static correction pulley 41 and a trimmer pulley 42 and is affixed to a dynamic correction lever arm 44 as discussed in detail hereinafter. Since the length of the second cable 40 between the bracket 38 and the affixing point 46 on the calibration lever 44 is affixed, it may be seen that the arcuate position of the head 20 affixed thereto is varied by varying the position of the static correction pulley 41. Referring particularly to FIGURE 4 the static correction pulley 41 is rotatably mounted at one end of a pulley lever arm 47 which is pivotally mounted upon a pivot bearing 48 to rotate substantially in the plane of the arcuate movement of the head 20, i.e., in a plane perpendicular to the axis at the drum 21. The pivot point 48 of the lower arm 47 is approximately at the midpoint of the lever arm. At the opposite end of the lever arm 47, the cam follower 49 is rotatably mounted to maintain contact with the cam surface 50. The cam surface 50 is linear in this embodiment and is sloped upward and to the right in FIGURE 4. Since the rocker member is urged to the right by the first cable 39 the second cable is maintained in tension and urges the static pulley 41 to the right to rotate the pulley arm 47 in a counterclockwise direction in the figure. Accordingly, if the cam 51 is lowered the cam surface 50 forces the cam follower 49 to the right, rotates the lever arm 47 clockwise and moves the rocker arm member 31 to the left against the pressure of the spring 43. Contrariwise, if the cam is raised the lever arm is allowed to move counterclockwise by the cam follower and the spring 43 moves the rocker member right in the figure. Thus, the arcuate position of the head 20 may be varied with respect to the surface of the drum 21 by raising and lowering the cam 51, therefore, the magnetic head 20 which is used to produce or read a signal upon a recording medium mouned upon the drum is displaced along the direction of motion of the recording medium. Since the time-scale of the magnetic record is measured along the direction of motion of the drum such a displacement is tantamount to an alternation of the time origin. Time origin corrections $A_n$ for each channel are therefore made by varying the position of the cam 51 associated with the respective channel. That is, a cam 51 such as that described above shown in FIGURE 4 is associated with each channel in the multi-channel recording apparatus and each cam is independently movable to vary the recording point of the channel.

Figure 5:
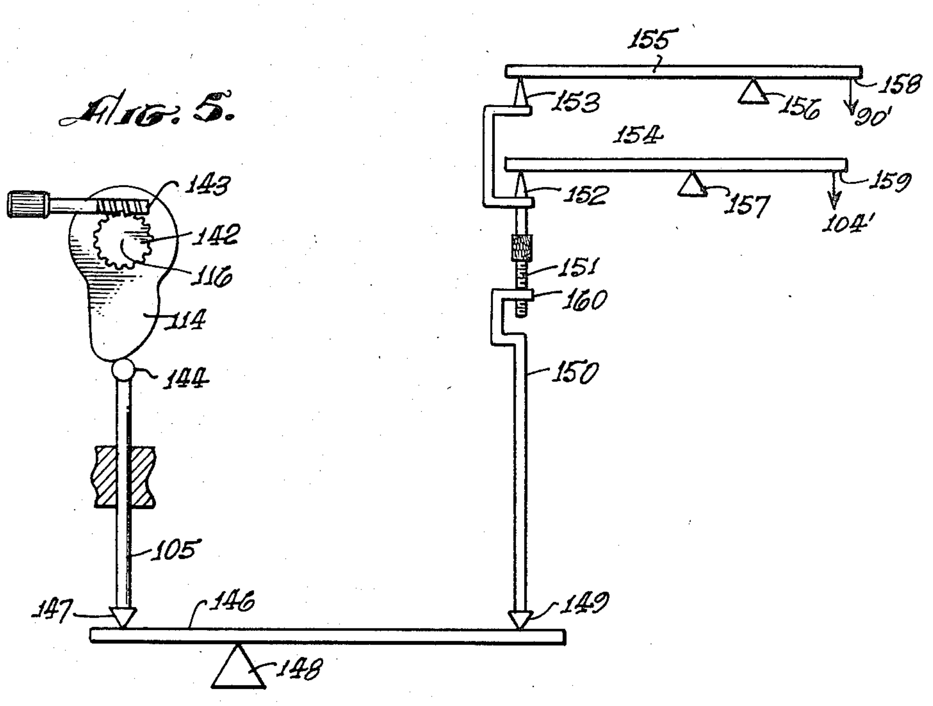
FIGURE 5 is a schematic view of the operating components of the apparatus utilized to illustrate schematically the operation thereof.

Referring now to FIGURES 1 through 4 and 7 the means for obtaining the dynamic time-scale component $B_n\ [aF(t-t_0)+b]$ in the time scale transformation is shown. Referring particularly to FIGURES 2 and 4 a lever arm 44 in accordance with the present invention is shown. The dynamic arm 44 is affixed at one end to a rotatable shaft 81 perpendicular thereto. The dynamic arm 44 provides a plurality of affixing points 46 to which the head cable 40 for each channel is affixed. Referring to FIGURE 2 the plurality of head cables 40 are attached to the lever arm 44 at predetermined distances from the shaft 81 which corresponds to the pivot point of the dynamic arm. The distance from the pivot point 81 at which each cable is affixed to the dynamic arm is determined by the quantity $B_n$ for each channel. In this embodiment the present invention is applied to a 24 channel multi-channel recorder with a pair of dynamic arms introducing the function $F_n(t)$ into two series of 12 channels each. In this embodiment each lever arm 44 is a circular segment with a series of concentric circular shoulders 45 each having a radius proportional to $B_n$ corresponding to channel n. The head cables 40 are then affixed to one side of the lever arm and as the lever arm rotates the shoulder maintains the point of tangency of the cable a fixed distance from the pivot point which distance is proportional to $B_n$. Since the construction and operation of both lever arms 44 and 45 shown in FIGURES 2 and 4 are similar, one will be described in construction and operation for purposes of clarity. The lever arm is mounted upon the chassis of the multi-channel recorder as shown in FIGURES 2 and 4. The shaft 81 is rotatably affixed to siutable mounting means 82 within the chassis such that the dynamic arm pivots about the pivot point 81 in a plane substantially parallel to the plane defined by the plurality of cables extending to the dynamic arm 44 from the respective rocker mountings. The shaft 81 is mounted proximate the center channels in FIGURE 2 with each shaft being substantially equi-distant from the midpoint of the channels being served by the two dynamic arms 44 and 45. Thus, the dynamic arm 44 rotates in the plane of the cables about the pivot point 81. It may be seen that the cable which is affixed to the dynamic arm 44 at the affixing point 46 furthermost from the pivot point 81 will be moved through the greatest distance by rotation of the dynamic arm. That is, the cable affixed at the outermost point will be moved through the greatest distance while a cable affixed at the innermost point will be moved the least by rotation of the dynamic arm 44 through a predetermined angular distance. Thus, the amount of relative movement of the heads is determined by the position at which the head cable 40 for a given channel is affixed to the dynamic arms 44 and 45 when the dynamic arms are rotated. In addition, the rate of change of position is determined by the rate at which the dynamic arms 44 and 45 are moved through the required angular distance. Thus, the dynamic time scale calibration is defined for each channel as $B_nF(t)$ where $n$ denotes any channel, $B_n$ is determined by the location of the head cables 40 on the dynamic arms 44 and 45 and $F(t)$ is determined by the rate of movement of the arms. It is with this rate of movement that the time function portion of the apparatus as shown in FIGURE 1 and schematically in FIGURE 5 is concerned.

Means are provided for rotating the dynamic arm a predetermined angular distance at a predetermined rate, for example, from the forward position at which the arm 44 rests against the stop 89 to the position shown in FIGURE 2. In the presently preferred embodiment of the present invention an actuating cable 90 is affixed to the dynamic arm 44 extending oppositely to the direction of movement of the arm 44 which is urged by the tension in the cables 40. The cable 90 is affixed to a pulley 92 which is in turn affixed to the end of a rotating first shaft 93 extending through the side wall 94 of the chassis 29. The pulley 92 lies substantially in the plane of the cable 90 while the shaft is substantially perpendicular thereto. The first shaft is tubular and rotatably mounted in a bearing surface defined by the side wall with a second shaft pulley 95 affixed to the second end of the first shaft 93. The first shaft is longitudinally affixed by means of brackets 97 and 98 positioned adjacent the opposite ends of the first shaft to act as thrust bearings therefor. A second shaft 96 extends through the first shaft and is rotatably supported therein. The second shaft 96 is longitudinally affixed by brackets 99 and 100 which are positioned adjacent the inner end 101 and outer end 102 of the shaft in which defined bearings within which the shaft rotates. In addition, a support bearing is provided in the bracket 97 through which the second shaft extends. A second pulley 105 is affixed to the inner end 101 of the second shaft 96 and lies substantially in the plane of the actuating cable 104 which is affixed to the second dynamic arm 45 as described in connection with the first dynamic arm 44. A second shaft pulley 106 is affixed to the outer end 102 of the second shaft outwardly of the shaft pulley 95 of the first shaft. Thus, it may be seen that the first shaft 93 and second shaft 96 may be rotated independently by turning the respective pulleys 95 and 106. Rotation of the first shaft 93 causes the dynamic arm 44 to be moved which in turn causes movement of the magnetic heads 20 affixed thereto, while rotation of the second shaft 96 causes movement of the second dynamic arm 45 and the series of heads affixed thereto.

Referring now to FIGURES 1, 2, and 4 the means of the present invention for imparting the required rotation to the shaft pulleys 95 and 106 in order to define the portion (F($t$) of the function $B_nF(t)$ at the magnetic heads is shown. The drum 21 is driven at constant speed by means well known to the art such as a synchronous motor which is not shown. The rotating shaft 110 of the drum 21 extends through the side wall 94 of the apparatus chassis 29 and rotates within a bearing mounted in the side wall. Affixed to the side wall 94 is a magnetic clutch 111 or other engaging means of the type well known to the art, which can be engaged to rotate with the drum shaft 110. The magnetic clutch is mounted concentrically with respect to the drum shaft and can be energized by an electrical signal to become directly connected to the shaft and rotate therewith. The driven portion of the magnetic clutch, i.e., the portion of the clutch which rotates with the shaft when the clutch is engaged, is connected to a rotating cam means 114. The clutch may be connected with the cam means to drive the cam by methods known to the art. Thus, it may be directly connected or connected through a belt or driving chain. In the embodiment shown a Gilmer belt drive is used. The cam shaft 116 is rotatably mounted by means of bearings upon the side wall 94 of the apparatus chassis at a position above the magnetic clutch 111. A driven pulley 117 is affixed to the cam shaft 116 substantially in the plane of the driving pulley of the clutch 111. A driving belt 120 is connected between the cam shaft pulley 117 and the clutch pulley 118. In this embodiment a one-to-one ratio is used between the clutch pulley and cam shaft pulley such that the cam 114 rotates at the same angular rate as the clutch and consequently at the same angular rate as the drum 21. In accordance with the present invention, the movement of the lever arms as a function of time can be most clearly understood with reference to the schematic diagram of FIGURE 5 in connection with the detailed drawing of the apparatus corresponding to this schematic diagram as shown in FIGURE 1.

The time function cam 114 is a mechanical representation of the function F($t$) where the time $t$ corresponds to the angular position of the cam about its shaft 116. The radial dimension of the cam 114 is such that the cam follower 144 is displaced a distance proportional to F($t$) for each angular position of the cam 114.

The geared wheel 142 is driven by the worm 143 to change the angular position of the cam 114 relative to the shaft 116. Such motion of the cam 114 about the shaft 116 corresponds to a change of time scale so that $t$ is replaced by $t-t_0$ where $t_0$ is proportional to the angular displacement produced by the worm 143. The transformation of time scale from $t$ to $t-t_0$ is mathematically termed a displacement or more particularly a time displacement. The cam follower 144 is integral with the shaft 145 which in turn imparts its motion at a point 147 on lever 146. The displacement imparted to the point 147 is proportional to $F(t-t_0)$. In other words the argument $t$ of the function F($t$) is replaced by the argument $t-t_0$.

The lever 146 rotates about the fulcrum 148. The displacement of a point 149 near the opposite end of the lever 146 is also proportional to $F(t-t_0)$ but the constant of proportionality is under control of the operator who may move the fulcrum 148 so that the position of the point 149 is representable by the expression $aF(t-t_0)$ where $a$ is related to the position of the fulcrum 148.

The motion $aF(t-t_0)$ of the point 149 is transmitted to the rod 150 which is provided with a male threaded section 151 mated to a female threaded section 160 whereby the length of the rod 150 can be varied at the control of the operator whereby the displacement of the points 152 and 153 is caused to be $aF(t-t_0)+b$, that is the displacement is G($t$). G($t$) is thus seen to be a linear transformation of the function F($t$) and of the function $F(t-t_0)$. Adjustment of the screw 151 is the means by which the quantity $b$ is varied.

Spread-length control is attained by means of the fulcrums 156 and 157 on the levers 155–154 which permit a displacement $p_1G(t)$ to be attained at the affixing point 158 of the cable 90' and a different displacement $p_2G(t)$ to be attained at the affixing point 159 of the second cable 104'.

Figure 7:
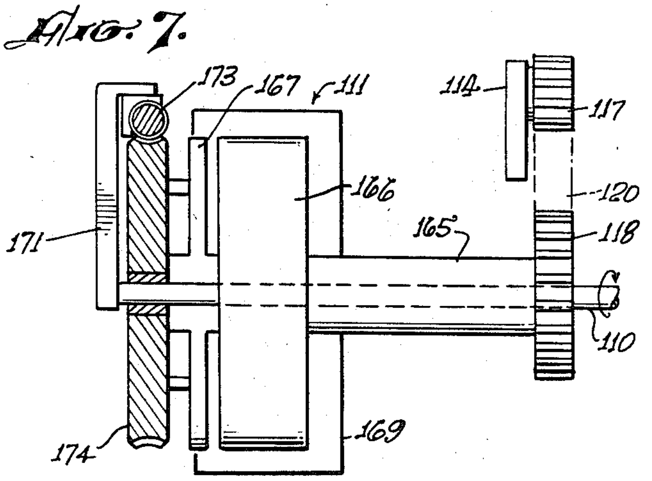
FIGURE 7 is a paritally schematic view of the magnetic clutch and cam arrangement.

Referring now particularly to FIGURES 1 and 7 the mechanical embodiment of the present apparatus corresponding to that shown schematically in FIGURE 5 is shown. A housing designated generally as 160 contains the apparatus. The linkages and connecting apparatus as discussed schematically are positioned in the portion of the housing adjacent the drum and head components as shown in FIGURE 2. The cam 114 is thus mounted upon the shaft 116 affixed to the housing in a manner well known to the art. The magnetic clutch 111 is shown in FIGURE 1 and is shown partially diagrammatically in FIGURE 7. In order to achieve the time shift to introduce the component $(t-t_0)$ as discussed in connection with FIGURE 5, a mechanical arrangement differing from that shown schematically in FIGURE 5 is utilized. In the presently preferred embodiment the time shift movement between the cam 114 and the magnetic drum is achieved by utilizing relative movement between the drum and cam through the magnetic clutch. The magnetic clutch as described hereinbefore is of the type well known to the art and has a housing 169 affixed to the chassis of the apparatus and a rotatable clutch rotor 166 affixed by means of a shaft 165 to a drive pulley 118 upon which a Gilmer belt 120 is mounted to connect with and drive the cam 114 when the clutch rotor 166 is rotated. The drum shaft 110 is connected by a worm housing 171 to a worm gear 173. The worm gear is mated with a ring gear 174 rotatably mounted upon the drum shaft 110 and is coupled to the clutch face 167. The drum shaft 110 and shaft 165 are concentrically arranged. Thus, when the clutch is energized the clutch face 167 engages the clutch rotor to rotate the shaft 165 synchronously with the drum shaft 110. Rotation of the shaft 165 causes the cam 114 to be rotated by the Gilmer belt 120. By turning the worm gear 173 when the clutch is engaged shaft 165 is rotated relative to the drum shaft 110, i.e., the worm gear moves relative to the ring gear which is engaged with the clutch plate causing relative rotation between the shafts and a shift in orientation between the drum and cam. Relative angular movement between the cam and drum therefore substitute $t-t_0$ for $t$ as described hereinbefore.

The cam follower 144 is of the conventional rolling type and is mounted at the end of the cam follower shaft 145 with which it is integral. The cam follower shaft 145 is mounted for linear movement in bearings 161 and 162. The cam follower shaft 145 has a pin 147 mounted thereon which is mateable with a slot 171 defined by the generally vertically extending lever arm 146 such that the shaft 145 and lever arm 146 are interconnected. The lever arm 146 is mounted for pivotal movement within a housing 173 which includes a slotted plate 174 which is located to the outer side of the lever arm with respect to the side wall 94. The slotted plate 174 lies in a substantially vertical plane and defines a vertical slot 175. A pivot plate 176 is vertically movable between the lever arm 146 and the slotted plate 174. Protrusions extend from the pivot plate 176 into the slots 175 defined in the slotted plate 174 to restrain the pivot plate 176 to vertical movement. A pivot 148 is affixed to the vertically moveable pivot plate and is mateable with the longitudinal slot 177 in the lever arm 146. Cables 178 and 179 are affixed to the pivot plate extending in opposite vertical positions therefrom. The cable 178 is extended over an idler pulley 181 and downwardly around idler pulley 182 and thence outwardly to a geared pulley 183. The cable 178 passes over the geared pulley 183 and becomes cable 179, the cables being a continuous loop. The portion of the cable 179 then passes outwardly from the gear pulley 183 over idler pulleys 184 and 185 and thence upwardly to the pivot block where it is affixed. Thus, the cable 178–179 is a closed loop adjustment with the ends of the cable affixed to and extending oppositely from the pivot bearing 148. When the geared pulley 183 is rotated by means of adjustment knob 190 the cable is shifted and consequently causes the pivot 148 to be raised or lowered. This corresponds to movement of the fulcrum 148 as shown in FIGURE 5. Thus the cam follower shaft 145 is moved linearly by the cam 114 and imparts that linear motion to one end of the lever arm 146 at the connecting point 147 where the pin 147 is engaged with the slot 171 at one end of the lever arm. The lever arm is then pivoted about the fulcrum point 148 and displaces the point 149 at the opposite end of the lever arm. The amount of displacement is proportional to $F(t-t_0)$ but the constant of proportionality is under the control of the operator who adjusts the fulcrum point of the lever arm 146 by adjustment of the knob 190 such that the adjustment is represented by the expression $aF(t-t_0)$ where $a$ is the constant introduced by movement of the fulcrum point 148.

The rod 150 as described in connection with FIGURE 5 is mounted beneath the lever arm 146 substantially in the plane thereof and is mounted for linear substantially horizontal movement in bearings 211 and 212. The rod 150 is thus substantially parallel to the cam follower shaft 145. The rod 150 is interconnected with the second end 149 of the lever arm 146 through a variable length adjustment designated generally as 210. The variable length adjusting means 210 includes the male threaded screw 151 and the female section 160 described hereinbefore. By rotation of the adjustment knob 191 the male threaded screw 151 is moved horizontally toward or away from the connecting point 149 of the lever arm 146. A connecting section 214 is in bearing engagement with an extension 215 which extends from the male threaded screw 151 toward the end 149 of the lever arm such that bearing engagement is provided between the extension 215 and the connecting rod 214 at a bearing point 300. By rotation of the male threaded screw the length of the extension rod 215 is varied to thus move the variable length adjusting means 210 toward or away from the pivot point 149 and thus lengthen or shorten the rod 150 by a predetermined amount. The variable length adjusting means 210 slidably engaged with the rod 150 and the amount of extension imparted to the rod 215 by rotation of the knob 191 is indicated upon a dial indicator 216. This introduces the constant $b$ to the time scale transformation such that the displacement of the point 153 shown in FIGURE 1 is caused to be $aF(t-t_0)+b$.

Figure 6:
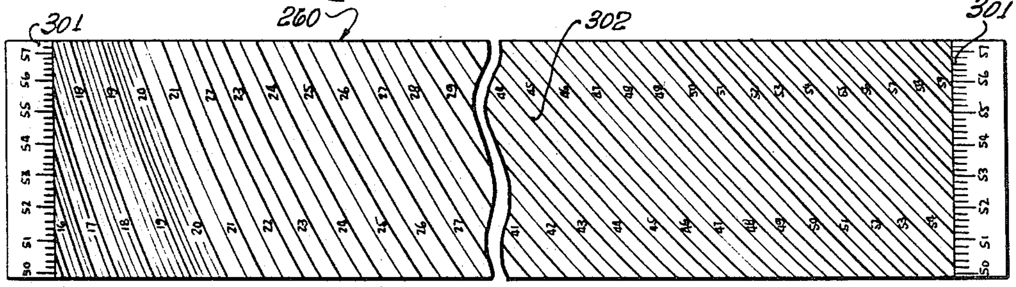
FIGURE 6 is a reproduction of a portion of the spread length adjustment dial band of the apparatus.

The rod 150 is then connected to substantially vertically oriented lever arms 155 and 154 which have variable fulcrum points to introduce spread length control as discussed schematically hereinbefore. In FIGURE 1 only the lever arm 155 is shown for purposes of clarity. The lever arms 155 and 154 are similar and are similarly mounted. Accordingly only the mounting and operation of lever arm 155 will be discussed in further detail. The lever arm 155 is pivotably affixed at pivot point 226 to a linearly movable support rod 221 which is mounted in bearings 222 and 223. Thus, pivotal movement of the lever arm 155 about the fulcrum point 156 imparts a linear movement to the support rod 221. Cable 90 is affixed to the support rod 221 at an affixing point 158 and extends from the affixing point 158 over idler pulleys 224 and 225 and thence upwardly where it is affixed to the shaft pulley 95 as discussed hereinbefore. Accordingly, movement of the support rod 221 imparts rotary movement to the shaft pulley 95. The opposite end of the lever arm 155 defines a longitudinally extending slot 230 within which the pivot pin 153 affixed to the rod 150 is mateable. Movement of the lever arm 155 is then transmitted from the rod 150 to the second end of the lever arm 155 by the pin 153 and such movement causes pivotal movement of the lever arm 155 about the fulcrum point 156 and imparts linear movement to the support rod 221 at the pivot point 226. Since the pivot point 226 is constrained, the lever arm 155 is free to pivot and move longitudinally about both the connecting pin 153 and the fulcrum point 156. Movement of the fulcrum point 156 is obtained in a manner similar to that previously described in connection with lever arm 146. A pivot plate for each lever arm, i.e., 155 and 156 is vertically slidable in a slot defined in a pivot plate 235 positioned proximate the outer surface of the outer lever arm 155. The vertical slot for the opposite lever arm 154 is positioned to the inward side adjacent the side plate 94 of the apparatus. The pivot plate 236 has a pivot pin 156 affixed thereto and is movable within the slot 237 defined by the pivot plate 235 such that the pivot pin 156 is slidably movable in a longitudinal slot 240 defined by the lever arm 155. Movement of the pivot plate 236 and thus the fulcrum point 156 upwardly or downwardly by means of a cable 241 having its first end 242 affixed to the pivot plate extending downwardly therefrom over an idler pulley 243 thence upwardly to a geared pulley 245 thence downwardly where its second end is affixed to the upper side of the pivot plate at affixing point 246. Thus, the cable 241 is again a closed loop adjusting cable which is moved by rotation of the geared pulley 245 to cause upward or downward movement of the pivot plate 236 and the pivot point 156. Rotation of the geared pulley is attained by a worm gear which engages a ring gear 250. The worm gear is rotated by a rod 251 which extends to the outer face of the apparatus and is rotated by an adjustment dial 255. A similar adjustment dial and geared pulley are provided for movement of the pivot point 157 of the lever rod 154. Affixed to the adjusting gear 250 is an indicating ring gear 256 which is meshed with a smaller spur gear 257. A dial bank 260 as shown particularly in FIGURE 6 is mounted upon the spur gear 257 and is affixed through a closed loop to a spread length indicator 261 at the face of the apparatus as described hereinafter. Thus, adjustment of the knob 255 causes the pivot point 156 to be moved upwardly or downwardly and varies the displacement of the cable 90 at the affixing point 158 in accordance with the function $p_1G(t)$ and at the affixing point 159 of the second cable 104 at the lever arm 154 in accordance with the function $p_2G(t)$.

The dial band 260, a typical specimen of which is particularly shown in FIGURE 6, provides the means for operator determination of the constants $p_1$ and $p_2$ which adjust the moveout correction for spread length. The dial band has identical horizontal scales 301 at the top and bottom. These horizontal scales designate the basic spread length for which the function $G(t)=aF(t-t_0)+b$ is chosen to be valid.

When the basic spread length for a group of records has been specified to the operator, he selects a suitable spread band which includes within its spread range, on the scale 301, that chosen basic spread. The choice is made purely on the basis of numerical value of the basic spread so that for a given spread, different bands may be chosen depending on units of measurement. For example, the same basic spread may be designated with the lengths 5000 feet, 1.524 kilometers, or 1.000 seconds (of water travel time). The operator then mounts the chosen band 260 upon the apparatus. He then sets transparent cursor 310 so that index line 311 inscribed thereon coincides with the numerical value of the specified basic spread on scales 301 which are visible through window 312 when the band has been rotated to one of its extremes by knob 255. Separate cursors, separate bands, and separate windows are provided for channels 1–12 and 13–24.

Spread lines 302 are drawn on the band 260 to represent spreads differing from the basic spread. Spread lines 302 are provided for from a value slightly greater than that of the basic spread to very much smaller spreads. The exact spacing of the lines represents a calibration of the entire apparatus such that a given movement of the band is related by an empirically determined calibration curve to a change in moveout correction at the heads for channels 1 and 24. In addition, the relationship between spread length and moveout is determined according to well known mathematical principles such as the relationships disclosed in U.S. Patent No. 3,045,241 supra. The spread lines 302 thus represent the relationship between spread length and the proportionately parameters $p_1$ and $p_2$.

In practice, the operator is presented with the actual spreads for 1–12 and 13–24 applicable to each given magnetic tape submitted for processing. He simply rotates knobs 255 to bring the bands 260 into positions such that the presented actual spread values correspond to the spread lines 302 having the same values. The spread line values are read to the intersections of vertical index lines 311 with horizontal index lines 313.

Thus, the present invention provides an improved apparatus for applying time-scale corrections and calibrations in a multi-channel magnetic recorder wherein various parameters of the necessary time-scale transformation can be introduced quickly and efficiently without the substitution of any working or operating parts of the apparatus.

What is claimed is:

1. In a multichannel magnetic recording apparatus of the type wherein a plurality of signals recorded on a magnetic tape are read by a plurality of magnetic reproducing heads, the tape having a plurality of spaced apart parallel channels, each of the reproducing heads being mounted for relative movement in a respective one of the channels, means for independently varying the time scale position at which each of the reproducing elements is proximate the tape in the respective channels comprising:

motion distributing means for selectively imparting motion to said reproducing heads;

a time function cam coupled to the magnetic tape for movement therewith, said cam having a configuration defining the function F($t$); and, means for transmitting the function F($t$) from said cam to said motion distributing means, means for selectively introducing into said transmitting means the parameters $a$, $b$ and $t_0$ to modify F($t$) such that movement of said motion distributing means is in accordance with the function $aF(t-t_0)+b$.

2. In a multi-channel magnetic recording apparatus of the type wherein a plurality of signals recorded on a magnetic tape are read by a plurality of magnetic reproducing heads, the tape having a plurality of spaced apart parallel channels, each of the reproducing heads being mounted for relative movement in a respective one of the channels, means for independently varying the time scale position at which each of the reproducing elements is proximate the tape in the respective channels comprising:

motion distributing means for selectively imparting motion to said reproducing heads;

a time-function cam rotatable with said magnetic tape, said cam having a configuration defining the function F($t$);

linkage means interconnecting said cam and said motion distributing means; and means for selectively introducing the parameters $a$, $b$ and $t_0$ into said linkage means whereby the motion distributing means is moved in accordance with a modified function defined as $aF(t-t_0)+b$.

3. In a multi-channel magnetic recording apparatus of the type wherein a plurality of signals recorded on a magnetic tape are read by a plurality of magnetic reproducing heads, the tape having a plurality of spaced apart parallel channels, each of the reproducing heads being mounted for relative movement in a respective one of the channels, means for independently varying the time scale position at which each of the reproducing elements is proximate the tape in the respective channels comprising:

a dynamic lever arm mounted for pivotal movement, means connecting each of said reproducing elements to said dynamic lever arm at a predetermined radius from the pivot point;

a time-function cam rotatable with said magnetic tape, said cam having a configuration defining the function F($t$);

linkage means interconnecting said cam and said dynamic lever arm; and means for selectively introducing the parameters $a$, $b$ and $t_0$ into said linkage means whereby the dynamic lever arm is moved in accordance with a modified function defined as $aF(t-t_0)+b$.

4. In a multichannel magnetic recording apparatus of the type wherein a plurality of signals recorded on a magnetic tape are read by a plurality of magnetic reproducing heads, the tape having a plurality of spaced apart parallel channels, each of the reproducing heads being mounted for relative movement in a respective one of the channels, means for independently varying the time scale position at which each of the reproducing elements is proximate the tape in the respective channels comprising:

a dynamic lever arm mounted pivotal movement, means connecting each of said reproducing elements to said dynamic lever arm at a predetermined radius from the pivot point;

a time-function cam rotatable with said magnetic tape, said cam having a configuration capable of generating a function $F(t-t_0)$;

linkage means interconnecting said cam and said dynamic lever arm;

said linkage means including;

a cam follower movable by said cam;

a first linkage pivotally affixed to said cam follower, said first linkage having a fulcrum point which is variable in location to introduce a proportionality constant a;

a second linearly movable linkage pivotally affixed to said first linkage, said second linkage being variable in length to introduce a linear transformation b thereby generating the function $aF(t-t_0)+b=G(t)$; and means interconnecting said second linkage to said dynamic lever arm.

5. In a multichannel magnetic recording apparatus of the type wherein a plurality of signals recorded on a magnetic tape are read by a plurality of magnetic reproducing heads, the tape having a plurality of spaced apart parallel channels, each of the reproducing heads being mounted for relative movement in a respective one of the channels, means for independently varying the time scale position at which each of the reproducing elements is proximate the tape in the respective channels comprising:

a dynamic lever arm mounted for pivotal movement, means connecting each of said reproducing elements to said dynamic lever arm at a predetermined radius from the pivot point;

a time-function cam rotatable with said magnetic tape, said cam having a configuration capable of generating a function $F(t-t_0)$;

linkage means interconnecting said cam and said dynamic lever arm;

said linkage means including;

a cam follower movable by said cam;

a first linkage pivotally affixed to said cam follower, said first linkage having a fulcrum point which is variable in location to introduce a proportionality constant a;

a second linearly movable linkage pivotally affixed to said first linkage, said second linkage being variable in length to introduce a linear transformation $b$ thereby generating the function $aF(t-t_0)+b=G(t)$;

means interconnecting said second linkage to said dynamic lever arm; and a third linkage pivotally connected to said second linkage, said third linkage having a variable fulcrum point which is variable in location to introduce a proportionality constant $p$, such that $G(t)$ transmitted to said dynamic lever arm is modified to $pG(t)$.

References Cited

UNITED STATES PATENTS

| | | | |
|---|---|---|---|
| 2,440,971 | 5/1948 | Palmer ------------ | 340—15.5 |
| 3,044,041 | 7/1962 | Salvatori ---------- | 340—15.5 |
| 3,095,552 | 6/1963 | Alexander --------- | 340—15.5 |

BERNARD KONICK, *Primary Examiner.*

L. J. SCHROEDER, *Assistant Examiner.*